(12) United States Patent
Zhang et al.

(10) Patent No.: US 11,435,632 B2
(45) Date of Patent: Sep. 6, 2022

(54) ARRAY SUBSTRATE AND DISPLAY PANEL

(71) Applicant: Shenzhen CHINA STAR OPTOELECTRONICS SEMICONDUCTOR DISPLAY TECHNOLOGY CO., LTD., Guangdong (CN)

(72) Inventors: Qi Zhang, Guangdong (CN); Wu Cao, Guangdong (CN); Yihe Zhang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 162 days.

(21) Appl. No.: 16/756,002

(22) PCT Filed: Mar. 5, 2020

(86) PCT No.: PCT/CN2020/077918
§ 371 (c)(1),
(2) Date: Apr. 14, 2020

(87) PCT Pub. No.: WO2021/147142
PCT Pub. Date: Jul. 29, 2021

(65) Prior Publication Data
US 2021/0405487 A1    Dec. 30, 2021

(30) Foreign Application Priority Data

Jan. 21, 2020 (CN) .......................... 202010068728.3

(51) Int. Cl.
*G02F 1/1362* (2006.01)
*G02F 1/1335* (2006.01)
*G02F 1/1343* (2006.01)

(52) U.S. Cl.
CPC .. *G02F 1/136286* (2013.01); *G02F 1/133512* (2013.01); *G02F 1/134309* (2013.01); *G02F 1/136222* (2021.01)

(58) Field of Classification Search
CPC ......... G02F 1/136222; G02F 1/133512; G02F 1/136286; G02F 1/136227
See application file for complete search history.

(56) References Cited

U.S. PATENT DOCUMENTS

2011/0273649 A1* 11/2011 Matsui .............. G02F 1/133514
349/107
2018/0061709 A1* 3/2018 Pai .......................... H01L 23/50

* cited by examiner

*Primary Examiner* — Jessica M Merlin

(57) ABSTRACT

The present invention provides an array substrate and a display panel, wherein the first protrusion and the second protrusion are provided in the filter unit of the color filter layer, and the second gap between the data line and the drain is covered with the first protrusion and/or the second protrusion, to solve the problem that a residue of the ITO exists in the second gap, which causes short circuit between the pixel electrode and the DBS electrode, such that the product yield is elevated, and the display effect is improved, thus enhancing customer experience.

16 Claims, 2 Drawing Sheets

ARRAY SUBSTRATE AND DISPLAY PANEL

BACKGROUND OF INVENTION

The present application claims priority to Chinese patent application no. 202010068728.3 submitted to Chinese Patent Office on Jan. 21, 2020, entitled "array substrate and display panel", the entire contents of which are incorporated herein by reference.

Field of Invention

The present invention relates to a field of display technology, and in particular, to an array substrate and a display panel.

Description of Prior Art

A display device can transform the computer's data into various characters, numbers, symbols, or intuitive images for display, and an input tool such as a keyboard can be used to input commands or data into the computer, and system hardware and software are employed to add, delete, and change the display content whenever necessary. Display devices are classified into plasma, liquid crystal, light emitting diode, and cathode ray tube types according to display devices used.

A liquid crystal display (LCD) uses liquid crystal material as the basic component, wherein a liquid crystal material is filled between two parallel plates, and an arrangement of molecules inside the liquid crystal material is changed by voltage to achieve the purpose of light shading and light transmission to display regularly distributed images with different shades, and as long as a color filter layer of three primary colors is added between the two plates, a color image can be displayed.

Multi-domain alignment liquid crystal displays (MVA LCDs) have been widely used in large-size liquid crystal displays and TV applications with their advantages of high contrast and wide viewing angles. With evolution towards a large-size screen, the design of 8-domain pixels has been valued in large-size displays due to its excellent viewing angle performance. However, the refinement in pixel size and the increase in a number of domains have seriously led to a reduction in transmittance of the panel. The emergence of demand-based switching (DBS) technology has improved the transmittance, DBS technology is to flexibly adjust the operating frequency and voltage of a CPU according to the load of the CPU.

When the pixel has a small size, the color filter layer has a half-opened opening, so that two structures of a pixel electrode and a DBS electrode are present simultaneously in the opening. Before ITO etching, a photoresist layer is first applied for photo-lithography to form the desired pattern. Because the color filter layer is relatively thick, it is easy to cause accumulation of the photoresist layer on a bottom side of the color filter layer and it cannot be removed, such that the ITO at this position will not be etched away during etching, which may easily cause the ITO to remain, and short-circuit phenomenon of the pixel electrode and the DBS electrode occurs. Therefore, there is an urgent need to improve the opening design of the color filter layer to avoid the above phenomenon.

SUMMARY OF INVENTION

An object of the present invention is to provide an array substrate, which can solve the problem that a residue of the ITO remains in the opening of the color filter layer in the existing array substrate, which causes short circuit between the pixel electrode and the DBS electrode, such that the product yield is elevated, and the display effect is improved, thus enhancing customer experience.

In order to solve the above problem, the present invention provides an array substrate including a color filter layer including at least one filter unit, wherein the filter unit includes: a filter body; an opening extending from one side of the filter body to a middle portion of the filter body, wherein the opening is defined and surrounded by a first side, a second side, and a third side connected end to end, and the first side is disposed opposite to the third side; a first protrusion protruding from the first side of the opening; and a second protrusion protruding from the third side of the opening and disposed opposite to the first protrusion.

Further, the filter unit further includes: a first gap formed between the first protrusion and the second protrusion.

Further, the array substrate further includes: a first substrate; a gate disposed on the first substrate; a drain disposed on the gate; and a data line disposed on the first substrate, wherein a second gap is formed between the data line and the drain, wherein the color filter layer is disposed on the first substrate and extends to cover surfaces of the data line and the drain, the drain is disposed in the opening, and the second gap is covered by the first protrusion and/or the second protrusion.

Further, the filter unit further includes: a pixel electrode disposed on the drain and extending from the opening to a surface of the color filter layer; and a DBS electrode disposed on the color filter layer and disposed opposite to the data line.

Further, the filter unit further includes: a first insulating layer disposed between the gate and the drain.

Further, the filter unit further includes: a second insulating layer disposed between the drain and the pixel electrode, and extending to cover the color filter layer.

Further, the pixel electrode and the DBS electrode are spaced apart from each other.

An object of the present invention is to provide a display panel, which can solve the problem that a residue of the exists in the opening of the color filter layer in the existing array substrate, which causes short circuit between the pixel electrode and the DBS electrode, such that the product yield is elevated, and the display effect is improved, thus enhancing customer experience.

In order to solve the above problems, the present invention provides a display panel including the array substrate according to the present invention.

Further, the display panel further includes: a color filter substrate disposed above the array substrate correspondingly; a liquid crystal layer disposed between the array substrate and the color filter substrate; and a backlight module disposed on a side of the array substrate away from the color filter substrate.

Further, the color filter substrate includes: a second substrate; and a black matrix layer disposed on a side surface of the second substrate facing the array substrate.

The present invention provides an array substrate and a display panel, wherein the first protrusion and the second protrusion are provided in the filter unit of the color filter layer, and the second gap between the data line and the drain is covered with the first protrusion and/or the second protrusion, to solve the problem that a residue of the ITO exists in the second gap, which causes short circuit between the pixel electrode and the DBS electrode, such that the product yield is elevated, and the display effect is improved, thus enhancing customer experience.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Figure 1:
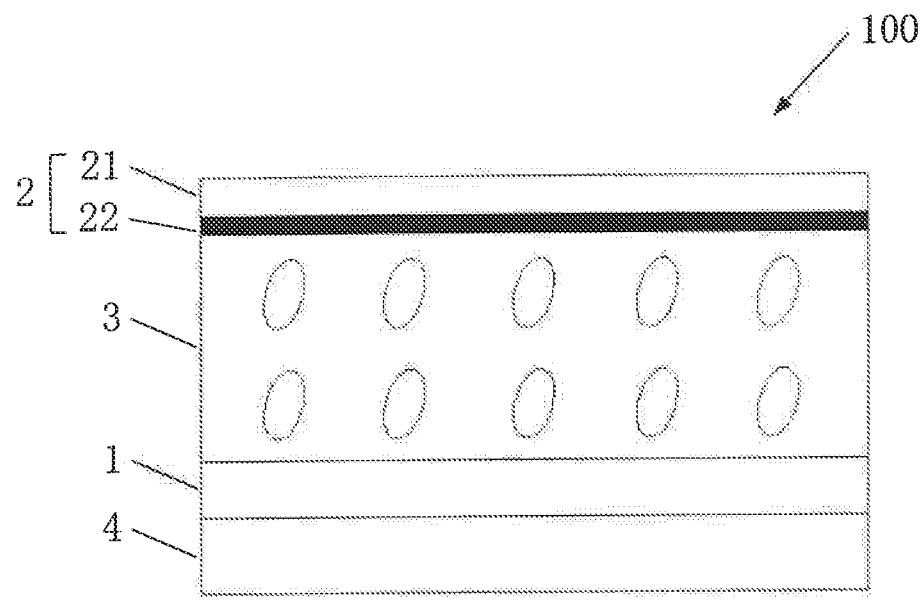
FIG. 1 is a schematic structural diagram of a display panel according to the present invention.

Elements in the drawings are designated by reference numerals listed below:
100. display panel; 1. array substrate; 2. color filter substrate; 3. lcd layer 4. backlight module; 11. first substrate; 12. gate; 13. first insulating layer; 14. drain; 15. data line; 16. color filter layer; 17. second insulating layer; 18. pixel electrode; 19. DBS electrode; 21. second substrate; 22. black matrix layer; 161, filter body; 162, opening; 163, first protrusion; 164, second protrusion; 1621, first side; 1622, second side; 1623, third side.

DETAILED DESCRIPTION OF PREFERRED EMBODIMENTS

The preferred embodiments of the present invention are described in detail below with reference to the accompanying drawings, in which FIG. Those skilled in the art will more readily understand how to implement the present invention. The present invention may, however, be embodied in many different forms and embodiments, and the scope of the present invention is not limited to the embodiments described herein.

The following description of the various embodiments is provided to illustrate the specific embodiments of the present invention. The spatially relative directional terms mentioned in the present invention, such as "upper", "lower", "before", "after", "left", "right", "inside", "outside", "side", etc., and the like, may be used herein for ease of description to describe one element or feature's relationship to another element(s) or feature(s) as illustrated in the figures which are merely references.

In the drawings, the spatially relative terms are intended to encompass different orientations in addition to the orientation as depicted in the figures. Moreover, the size and thickness of each component shown in the drawings are arbitrarily shown for ease of understanding and description, and the present invention does not limit the size and thickness of each component.

When a component is described as "on" another component, the components are formed in direct contact, and may also include embodiments in which additional features may be formed interposing the first and second features, such that the first and second features may not be in direct contact. When a component is described as "installed to" or "connected to" another component, it can be understood that a component is "directly installed" or "directly connected" to another component, or a component is "installed to" or "connected with" another component through an intermediate component.

EXAMPLES

As shown in FIG. 1, this embodiment provides a display panel 100 including an array substrate 1, a color filter substrate 2, a liquid crystal layer 3, and a backlight module 4.

Figure 2:
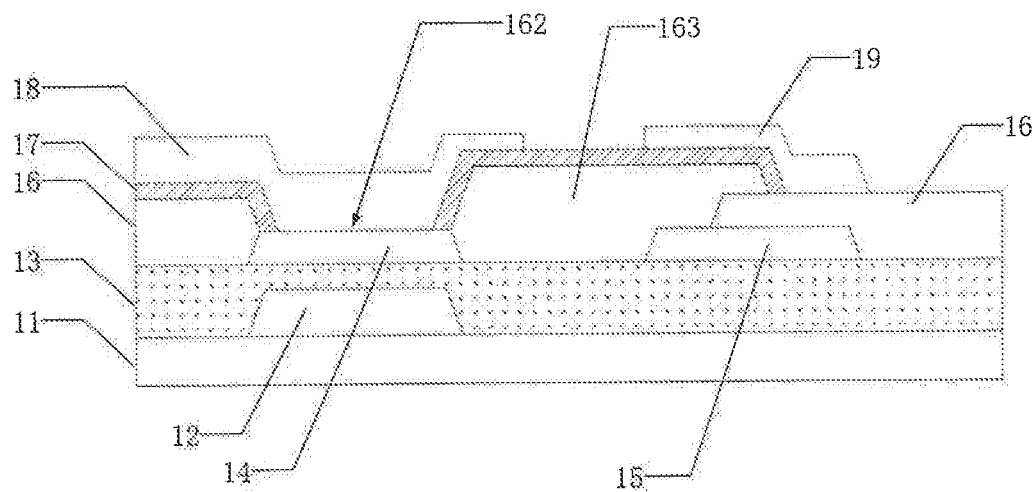
FIG. 2 is a schematic structural diagram of an array substrate according to the present invention.

As shown in FIG. 2, the array substrate 1 includes a first substrate 11, a gate electrode 12, a first insulating layer 13, a drain 14, a data line 15, a color filter layer 16, a second insulating layer 17, a pixel electrode 18, and a DBS electrode 19.

The first substrate 11 is made of a material including one or more of glass, silicon dioxide, polyethylene, polypropylene, polystyrene, polylactic acid, polyethylene terephthalate, polyimide, and polyurethane, to provide the first substrate 11 with good functions of blocking water and oxygen and protecting the panel.

As shown in FIG. 2, the gate electrode 12 is disposed on the first substrate 11; material of the gate layer 12 includes copper or molybdenum.

As shown in FIG. 2, the first insulating layer 13 is provided on the gate 12 to prevent short circuit between the gate 12 and the drain 14 through their contact. Material of the first insulating layer 13 includes one or more of $SiO_2$ and $SiN_x$.

As shown in FIG. 2, the drain 14 is disposed on the first insulating layer 13; material of the drain 14 includes copper or molybdenum. The data line 15 is disposed on the first insulating layer 13, and a second gap is formed between the data line 15 and the drain 14.

As shown in FIG. 2, the color filter layer 16 is disposed on the first insulating layer 13 and extends to cover the surfaces of the data lines 15 and the drains 14.

Figure 3:
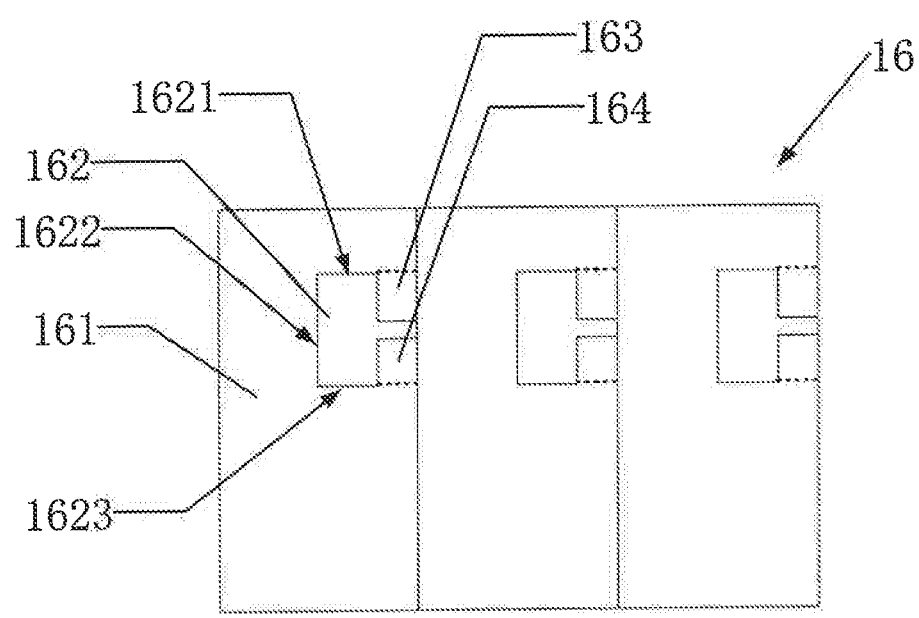
FIG. 3 is a schematic plan view of a color filter layer of an array substrate according to the present invention.

As shown in FIGS. 2 and 3, the color filter layer 16 includes at least one filter unit. The filter unit includes a filter body 161, an opening 162, a first protrusion 163, and a second protrusion 164. The opening 162 extends from one side of the filter body 161 to a middle portion of the filter body 161. The opening 162 is defined and surrounded by a first side 1621, a second side 1622, and a third side 1623 connected end to end. The first side 1621 is disposed opposite to the third side 1623. The first protrusion 163 protrudes from the first side 1621 of the opening 162; the second protrusion 164 protrudes from the third side 1623 of the opening 162 and is disposed opposite to the first protrusion 163; the first protrusion 163 protrudes from an end of the first side 1621 of the opening 162 away from the second side 1622; the first protrusion 163 protrudes toward the third side 1623, and similarly, the second protrusion 164 protrudes toward the first side 1621.

As shown in FIGS. 2 and 3, the drain 14 is located in the opening 162; the second gap is covered by the first protrusion 163 and/or the second protrusion 164. The second gap is covered by the first protrusion 163 and/or the second protrusion 164, so as to prevent the photoresist layer from accumulating at the opening 162. Therefore, when the ITO is etched, the ITO at the opening 162 is also etched away, thus avoiding occurrence of the residue of ITO at the opening 16, such that the problem of short circuit occurs between the pixel electrode 18 and the DBS electrode 19 is solved, the product yield is elevated, the display effect is improved, and thus the customer experience is improved.

The filter unit further includes a first gap formed between the first protrusion 163 and the second protrusion 164. Since lengths of the first protrusion 163 and the second protrusion 164 perpendicular to the second side is less than 10 μm, the first gap is mainly to prevent the first protrusion 163 and the second protrusion 164 from being connected together, and to avoid fracture to occur between the first protrusion 163 and the second protrusion 164.

As shown in FIG. 2, the second insulating layer 17 is disposed between the drain 16 and the pixel electrode 18 and extends to cover the surface of the color filter layer 16. The pixel electrode 18 penetrates the second insulating layer 17 at a position of the opening 162 and is connected onto the drain 16.

The pixel electrode 18 is disposed on the drain 16 and extends from the opening 162 to the surface of the second insulating layer 17. Material of the pixel electrode 18 includes one or more of ITO and IGZO.

The DBS electrode 19 is disposed on the second insulating layer 17 and is opposite to the data line 15. Material of the DBS electrode 19 includes one or more of ITO and IGZO. A signal line of the DBS electrode 19 is used to replace the black matrix layer, so as to achieve the effect of light shielding on the data line 15.

The pixel electrode 18 and the DBS electrode 19 are spaced apart from each other, mainly to prevent the pixel electrode 18 and the DBS electrode 19 from a short circuit due to contact with each other.

As shown in FIG. 1, the color filter substrate 2 is correspondingly disposed above the array substrate 1. The color filter substrate 2 includes a second substrate 21 and a black matrix layer 22. The black matrix layer 22 is disposed on a surface of the second substrate 21 facing the array substrate 1, and is mainly used to prevent light leakage or color mixing.

As shown in FIG. 1, a liquid crystal layer 3 is disposed between the array substrate 1 and the color filter substrate 2. A backlight module 4 is disposed on a side of the array substrate 1 away from the color filter substrate 2. The backlight module 4 mainly provides the array substrate 1, the liquid crystal layer 3, and the color filter substrate 2 thereon with incident light to realize the light emission of the display panel 100. The backlight module can be divided into a direct-lit backlight and an edge-lit backlight according to the position of the light source in the backlight module.

The array substrate and the display panel provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. An array substrate, comprising:
   a color filter layer comprising at least one filter unit, wherein, in a plan view of the color filter layer, the filter unit comprises:
   a filter body;
   an opening extending from one side of the filter body to a middle portion of the filter body, wherein the opening is defined and surrounded by a first side, a second side, and a third side connected end to end, and the first side is disposed opposite to the third side;
   a first protrusion protruding from the first side to the third side of the opening; and
   a second protrusion protruding from the third side to the first side of the opening and disposed opposite to the first protrusion,
   wherein a side of the opening opposite to the second side is flush with a side of the first protrusion.

2. The array substrate according to claim 1, wherein the filter unit further comprises:
   a first gap formed between the first protrusion and the second protrusion.

3. The array substrate according to claim 1, further comprising:
   a first substrate;
   a gate disposed on the first substrate;
   a drain disposed on the gate; and
   a data line disposed on the first substrate, wherein a second gap is formed between the data line and the drain,
   wherein the color filter layer is disposed on the first substrate and extends to cover surfaces of the data line and the drain, the drain is disposed in the opening, and the second gap is covered by the first protrusion and/or the second protrusion.

4. The array substrate according to claim 3, further comprising:
   a pixel electrode disposed on the drain and extending from the opening to a surface of the color filter layer; and
   a data line black matrix less (DBS) electrode disposed on the color filter layer and disposed opposite to the data line.

5. The array substrate according to claim 3, further comprising:
   a first insulating layer disposed between the gate and the drain.

6. The array substrate according to claim 4, further comprising:
   a second insulating layer disposed between the drain and the pixel electrode, and extending to cover the color filter layer.

7. The array substrate according to claim 4, wherein the pixel electrode and the DBS electrode are spaced apart from each other.

8. A display panel, comprising an array substrate, the array substrate comprising:
   a color filter layer, comprising at least one filter unit, wherein, in a plan view of the color filter layer, the filter unit comprises:
   a filter body;
   an opening extending from one side of the filter body to a middle portion of the filter body, wherein the opening is defined and surrounded by a first side, a second side, and a third side connected end to end, and the first side is disposed opposite to the third side;
   a first protrusion protruding from the first side to the third side of the opening; and
   a second protrusion protruding from the third side to the first side of the opening and disposed opposite to the first protrusion,
   wherein a side of the opening opposite to the second side is flush with a side of the first protrusion.

9. The display panel according to claim 8, wherein the filter unit further comprises:
  a first gap formed between the first protrusion and the second protrusion.

10. The display panel according to claim 8, wherein the array substrate further comprises:
  a first substrate;
  a gate disposed on the first substrate;
  a drain disposed on the gate; and
  a data line disposed on the first substrate, wherein a second gap is formed between the data line and the drain,
  wherein the color filter layer is disposed on the first substrate and extends to cover surfaces of the data line and the drain, the drain is disposed in the opening, and the second gap is covered by the first protrusion and/or the second protrusion.

11. The display panel according to claim 10, wherein the array substrate further comprises:
  a pixel electrode disposed on the drain and extending from the opening to a surface of the color filter layer; and
  a data line black matrix less (DBS) electrode disposed on the color filter layer and disposed opposite to the data line.

12. The display panel according to claim 10, wherein the array substrate further comprises:
  a first insulating layer disposed between the gate and the drain.

13. The display panel according to claim 11, further comprising a second insulating layer disposed between the drain and the pixel electrode, and extending to cover the color filter layer.

14. The display panel according to claim 11, wherein the pixel electrode and the DBS electrode are spaced apart from each other.

15. The display panel according to claim 10, further comprising:
  a color filter substrate correspondingly disposed above the array substrate;
  a liquid crystal layer disposed between the array substrate and the color filter substrate; and
  a backlight module disposed on a side of the array substrate away from the color filter substrate.

16. The display panel according to claim 15, wherein the color filter substrate comprises:
  a second substrate; and
  a black matrix layer disposed on a side surface of the second substrate facing the array substrate.

* * * * *